United States Patent
Kedambaimoole et al.

(10) Patent No.: US 11,378,467 B2
(45) Date of Patent: Jul. 5, 2022

(54) HIGHLY SENSITIVE REDUCED GRAPHENE OXIDE-NICKEL COMPOSITE BASED CRYOGENIC TEMPERATURE SENSOR

(71) Applicant: Indian Institute of Science, Karnataka (IN)

(72) Inventors: Vaishakh Kedambaimoole, Bangalore (IN); Pavithra B. Jain, Bangalore (IN); Manasa, Bangalore (IN); Nagarjuna Neella, Bangalore (IN); Rajanna Konandur, Bangalore (IN); M M. Nayak, Bangalore (IN); Narasimhiah Subrahmanyam Dinesh, Bangalore (IN)

(73) Assignee: Indian Institute of Science, Bangalore (IN)

( * ) Notice: Subject to any disclaimer, the term of this patent is extended or adjusted under 35 U.S.C. 154(b) by 279 days.

(21) Appl. No.: 16/520,449

(22) Filed: Jul. 24, 2019

(65) Prior Publication Data
US 2020/0049573 A1    Feb. 13, 2020

(30) Foreign Application Priority Data
Jul. 24, 2018    (IN) .............................. 201841027819

(51) Int. Cl.
*G01K 7/22* (2006.01)
*H01C 17/00* (2006.01)
*H01C 7/04* (2006.01)
*G01K 7/18* (2006.01)

(52) U.S. Cl.
CPC ............. *G01K 7/226* (2013.01); *G01K 7/186* (2013.01); *H01C 7/04* (2013.01); *H01C 17/00* (2013.01)

(58) Field of Classification Search
CPC .......... H01C 7/04; H01C 17/00; G01K 7/226; G01K 7/186
See application file for complete search history.

(56) References Cited

U.S. PATENT DOCUMENTS

| | | | | |
|---|---|---|---|---|
| 3,575,053 | A * | 4/1971 | Telinde | G01K 7/20 374/172 |
| 5,368,787 | A * | 11/1994 | Yonamoto | B01F 3/08 239/434 |
| 9,676,621 | B2 * | 6/2017 | Chen | B82Y 15/00 |
| 9,945,720 | B1 * | 4/2018 | Egerton | G01J 5/0853 |

(Continued)

FOREIGN PATENT DOCUMENTS

WO    WO-2018038795 A1 *   3/2018    ............. A01K 61/95

*Primary Examiner* — Kyung S Lee
(74) *Attorney, Agent, or Firm* — Osha Bergman Watanabe & Burton LLP

(57) ABSTRACT

The present disclosure generally relates to the field of resistive sensing. In particular, the present disclosure relates to a highly sensitive reduced graphene oxide-nickel (RGO—Ni) composite based fast response temperature sensor. Aspects of the present disclosure provide a method for fabrication of a highly sensitive reduced graphene oxide-nickel (RGO—Ni) composite-based temperature sensor. An aspect of the present disclosure provides a temperature sensor comprising: a substrate; and a composite film deposited onto said substrate, wherein the composite film comprises a reduced graphene oxide-nickel composite film. In an embodiment, the temperature sensor is cryo-compatible.

14 Claims, 18 Drawing Sheets

(56) References Cited

U.S. PATENT DOCUMENTS

| | | | |
|---|---|---|---|
| 2010/0118916 A1* | 5/2010 | Thomsen, III | G01K 7/028 |
| | | | 374/179 |
| 2012/0085945 A1* | 4/2012 | Lolla | G01F 23/2925 |
| | | | 250/577 |
| 2013/0040283 A1* | 2/2013 | Star | B82Y 30/00 |
| | | | 435/5 |
| 2016/0276056 A1* | 9/2016 | Stolyarov | C08J 3/11 |

* cited by examiner

HIGHLY SENSITIVE REDUCED GRAPHENE OXIDE-NICKEL COMPOSITE BASED CRYOGENIC TEMPERATURE SENSOR

CROSS-REFERENCE TO RELATED APPLICATIONS

This application claims priority under 35 U.S.C. § 119 to Indian Patent Application No. 201841027819, filed Jul. 24, 2018, the contents of which are incorporated herein in their entirety by reference.

TECHNICAL FIELD

The present disclosure generally relates to the field of resistive sensing. In particular, the present disclosure relates to a highly sensitive reduced graphene oxide-nickel (RGO—Ni) composite based fast response cryogenic temperature sensor. Aspects of the present disclosure provide a method for fabrication of a highly sensitive reduced graphene oxide-nickel (RGO—Ni) composite based cryogenic temperature sensor.

BACKGROUND

Background description includes information that may be useful in understanding the present invention. It is not an admission that any of the information provided herein is prior art or relevant to the presently claimed invention, or that any publication specifically or implicitly referenced is prior art.

The science of cryogenics is indispensable in mission critical industries like space industry, aerospace industry, biomedical industry, research and development and the likes. Temperature critical applications call for temperature sensors that are highly sensitive, responsive and robust. To cater to these extreme specifications, cryogenic temperature sensors fabricated until now came at a high premium, which inadvertently raised the financial investment.

Numerous temperature sensors have been conceived in order to cater to the cryogenics industry, yet all these devices demand high financial investment. These temperature sensors employ different principles for measuring the temperature which classify them into the following broad categories: diode based, resistance based (RTDs), capacitance based and thermocouple temperature sensors. The application requirements dictate the sensor selection. Among the various types of sensors, silicon diode temperature sensors enjoy huge popularity owing to their linear Temperature vs. Voltage curve (Shwarts et al, *A new generation of cryogenic silicon diode temperature sensors*, International Conference on Advanced Semiconductor Devices and Microsystems, 2008 Oct. 12, pp. 239-242) and stability over a wide range of temperatures. Yet, their performance is restricted by limitations imposed by high current consumption of 10 μA at ultra-low temperatures leading to self-heating due to power dissipation (Shwarts et al, *Advanced silicon diode temperature sensors with minimized self-heating and noise for cryogenic applications*, ASDAM 2000, Conference Proceedings, Third International EuroConference on Advanced Semiconductor Devices and Microsystems, Cat. No. 00EX386, pp. 351-354).

Resistance temperature detectors (RTDs) form a class of the most accurate cryogenic temperature sensors (Appendix B: Sensor Characteristics Lake Shore Cryotronics, Inc., 614.891.2244, 614.818.1600) owing to their sensing mechanism, which is based on change of resistance with respect to temperature. There are two types of RTDs, metal based, which have a positive temperature coefficient (PTC) of resistance and non-metal based, which generally have negative temperature coefficient (NTC) of resistance. The PTC RTDs while providing accurate reading consume high current in the range of milliAmperes, which not only leads to high power dissipation, but also self-heating, inducing erroneous temperature data at ultra-low temperatures. NTC RTDs like CERNOX®, Rhuthenium Oxide, and Germanium etc. are presently the most preferred choice for critical cryogenic applications (Appendix B: Sensor Characteristics Lake Shore Cryotronics, Inc., 614.891.2244, 614.818.1600), but, apart from being quite immoderate, each type suffers from a set of limitations. CERNOX®, which also has a High Reliability (Cryogenic Temperature sensors. Lakeshore cryotronics Available from: https://www.lakeshore.com/products/Cryogenic-Temperature-Sensors/Pages/default.aspx) variant for critical applications, works over a wide range of temperature but requires individual calibration for each device due to lack of a standard temperature vs. resistance curve. Coupled up with the demand of variable current source for different temperature bands, its usage in rapidly changing environment in real time is not feasible. Rhuthenium oxide temperature sensor, another NTC temperature sensor, though not limited by the lack of standard Temperature vs. Resistance curve, suffers from a short temperature range, exhibiting negligible sensitivity over 40K, thus limiting its usage to a very narrow band of temperature.

The temperature sensor market also comprises of secondary temperature sensors, which are not used as primary temperature sensors in cryogenic applications due to their inadmissible defects. Capacitive temperature sensor suffers from calibration shifts after a few thermal cycles thus making it ineligible for repetitive usage. Thermocouple, which utilizes the principle of Seebeck effect, is another secondary temperature sensor that does not give accurate readings, deviating up to 5-10 K from the actual temperature, thus rendering it ineffective for high precision applications.

All these sensors perform the main task of temperature sensing; however, they are incapable of performing additional tasks like resistive switching at cryogenic temperatures, apart from suffering from other limitations as enumerated here in above. There is therefore, a need in the art for improved sensors that, while exhibiting high sensitivity, alleviates one or more limitations associated with conventional sensors.

OBJECTS OF THE INVENTION

An object of the present disclosure is to overcome disadvantages associated with conventional temperature sensors.

Another objective of the present disclosure is to provide a Resistive Temperature Detector (RTD) type temperature sensor.

Another object of the present disclosure is to provide a method of fabrication of a Resistive Temperature Detector (RTD) temperature sensor.

Another object of the present disclosure is to provide a Resistive Temperature Detector (RTD) type temperature sensor that exhibits high sensitivity.

Another object of the present disclosure is to provide a temperature sensor that doesn't require a variable current source.

Another object of the present disclosure is to provide a temperature sensor that obviates the need of individual calibration for each device.

Another object of the present disclosure is to provide a temperature sensor that exhibits resistive thermal switching at temperatures below 100K.

Another object of the present disclosure is to provide a temperature sensor that is economical.

Another object of the present disclosure is to provide a temperature sensor that exhibits low current consumption, eliminating self-heating at low temperatures.

Still further object of the present disclosure is to provide a temperature sensor that exhibits constant current consumption of about 1 µA across all temperature bands obviating the need of dynamic current source.

The other objects and preferred embodiments and advantages of the present invention will become more apparent from the following description of the present invention when read in conjunction with the accompanying examples and figures, which are not intended to limit scope of the present invention in any manner.

SUMMARY

This summary is provided to introduce a selection of concepts in a simplified form that are further described below in Detailed Description section. This summary is not intended to identify key features or essential features of the claimed subject matter, nor is it intended to be used as an aid in determining the scope of the claimed subject matter.

The present disclosure generally relates to the field of resistive sensing. In particular, the present disclosure relates to a highly sensitive reduced graphene oxide-nickel (RGO—Ni) composite based fast response cryogenic temperature sensor. Aspects of the present disclosure provide a method for fabrication of a highly sensitive reduced graphene oxide-nickel (RGO—Ni) composite based cryogenic temperature sensor.

An aspect of the present disclosure provides a temperature sensor comprising: a substrate; and a composite film deposited onto said substrate, wherein the composite film comprises a reduced graphene oxide-nickel composite film. In an embodiment, the temperature sensor is cryo-compatible. In an embodiment, the reduced graphene oxide-nickel composite film is screen printed onto said substrate. In an embodiment, the composite film is further connected with a plurality of leads. In an embodiment, the composite film is connected with said plurality of leads using a conductive silver epoxy resin. In an embodiment, connection between said composite film and said plurality of leads is further strengthened using a thermal epoxy resin. In an embodiment, the temperature sensor is a cryogenic temperature sensor. In an embodiment, the temperature sensor is a cryogenic resistance based temperature sensor. In an embodiment, the temperature sensor is a cryogenic resistance based NTC temperature sensor. In an embodiment, the temperature sensor exhibits TCR ranging from $17.48 \times 10^{-3}$/K to $-148.10 \times 10^{-3}$/K. In an embodiment, the temperature sensor exhibits TCR of $-147.37 \times 10^{-3}$/K for a temperature below 10K. In an embodiment, the temperature sensor works at a temperature ranging from 400K to 2K. In an embodiment, the temperature sensor exhibits response time of 80 msec at a cryogenic temperature. In an embodiment, the temperature sensor consumes a current of about 1 µA across all temperature bands. In an embodiment, the reduced graphene oxide-nickel composite film has a thickness ranging from 5 µm to 200 µm. In an embodiment, the reduced graphene oxide-nickel composite film has a thickness of about 50 µm. In an embodiment, the reduced graphene oxide-nickel composite film has a width ranging from 0.05 mm to 2.5 mm. In an embodiment, the reduced graphene oxide-nickel composite film has a width of about 1 mm. In an embodiment, the reduced graphene oxide-nickel composite film has a length ranging from 0.1 mm to 10 mm. In an embodiment, the reduced graphene oxide-nickel composite film has a length of about 4 mm.

Another aspect of the present disclosure relates to a method of fabrication of a temperature sensor, the method comprising the steps of: taking graphene oxide; effecting reduction of graphene oxide using a reducing agent; effecting in-situ addition of nickel nanoparticles during the reduction of graphene oxide to realize a solution including reduced graphene oxide (rGO) and Ni nanoparticles; effecting deposition of said solution on a substrate such that a composite film is realized onto said substrate; and providing electrical connection with said composite film to realize the temperature sensor.

In an embodiment, the step of providing electrical connection with said composite film comprises: connecting a plurality of leads with said composite film; and strengthening the connection between said plurality of leads with said composite film. In an embodiment, said plurality of leads are connected with said composite film using a conductive silver epoxy resin. In an embodiment, the connection between said plurality of leads with said composite film is strengthened using a thermal epoxy resin. In an embodiment, the method further comprises the step of coating the temperature sensor with any or a combination of a moisture-proofing material and a dielectric material. In an embodiment, the moisture-proofing material and the dielectric material comprise parylene. In an embodiment, graphene oxide is synthesized by modified hummer's method. In an embodiment, the reducing agent is hydrazine hydrate. In an embodiment, the method further comprises the steps of: preparing a uniform solution of reduced graphene oxide (rGO) and Ni nanoparticles using a solvent; and homogenizing the uniform solution by ultrasonication to realize a homogenized solution before deposition thereof onto said substrate. In an embodiment, the step of deposition of said solution onto said substrate comprises the steps of: realizing a pattern using said solution onto said substrate using a mask; and effecting annealing of said pattern effecting removal of solvent from said pattern to realize the composite film onto said substrate. In an embodiment, the substrate comprises ceramic ($Al_2O_3$) substrate. In an embodiment, the pattern is realized onto said substrate by using screen printing technique. In an embodiment, the solvent is N-Methyl-2-pyrrolidone (NMP). In an embodiment, the plurality of leads are made of Indium. In an embodiment, the temperature sensor is a cryogenic temperature sensor. In an embodiment, the temperature sensor is cryo-compatible. In an embodiment, the temperature sensor is a cryogenic resistance based temperature sensor. In an embodiment, the temperature sensor is a cryogenic resistance based NTC temperature sensor. In an embodiment, the temperature sensor exhibits Temperature Coefficient of Resistance (TCR) ranging from $-17.48 \times 10^{-3}$/K to $-148.10 \times 10^{-3}$/K. In an embodiment, the temperature sensor exhibits TCR of $-147.37 \times 10^{-3}$/K for a temperature below 10K. In an embodiment, the temperature sensor works at a temperature ranging from 400K to 2K. In an embodiment, the temperature sensor exhibits response time of 80 msec at a cryogenic temperature.

Still further aspect of the present disclosure provides a cryo-thermal switch, characterized in that, the cryo-thermal switch comprises a reduced graphene oxide-nickel composite film.

Other aspects of the invention will be set forth in the description which follows, and in part will be apparent from the description, or may be learnt by the practice of the invention.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DETAILED DESCRIPTION

Figure 1:
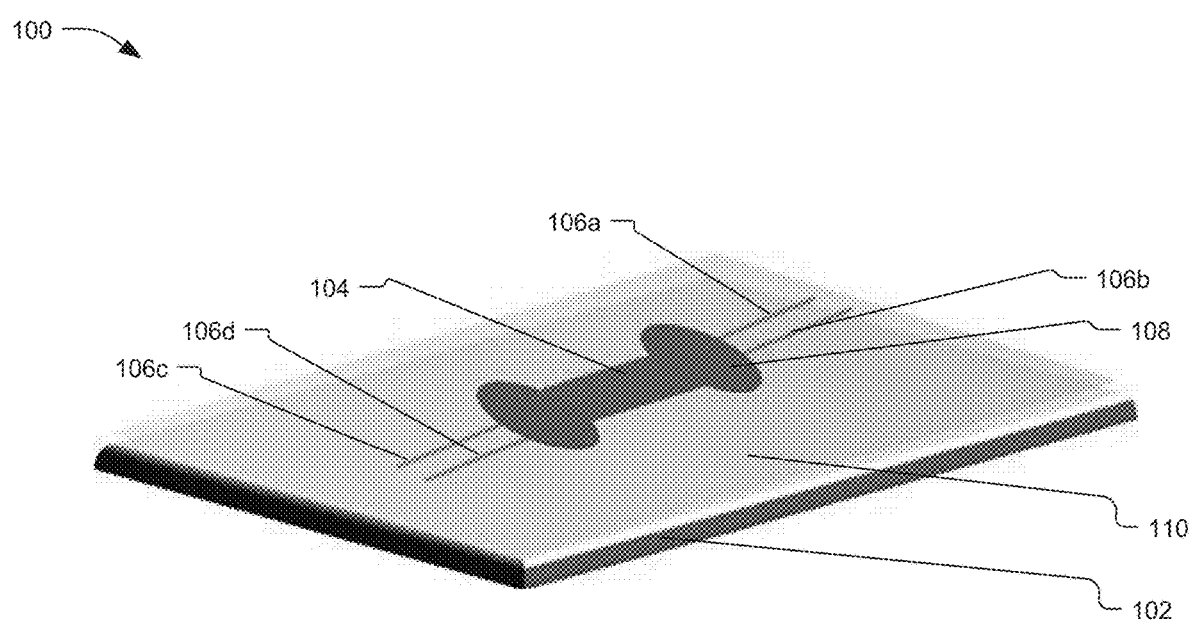
FIG. 1 illustrates an exemplary representation depicting the temperature sensor, realized in accordance with an embodiment of the present disclosure.

The following is a detailed description of embodiments of the disclosure depicted in the accompanying drawings. The embodiments are in such detail as to clearly communicate the disclosure. However, the amount of details offered is not intended to limit the anticipated variations of embodiments; on the contrary, the intention is to cover all modifications, equivalents, and alternatives falling within the spirit and scope of the present disclosure as defined by the appended claims.

Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

Various terms as used herein are shown below. To the extent a term used in a claim is not defined below, it should be given the broadest definition persons in the pertinent art have given that term as reflected in printed publications and issued patents at the time of filing.

The present disclosure generally relates to the field of resistive sensing. In particular, the present disclosure relates to a highly sensitive reduced graphene oxide-nickel (RGO—Ni) composite based fast response cryogenic temperature sensor. Aspects of the present disclosure provide a method for fabrication of a highly sensitive reduced graphene oxide-nickel (RGO—Ni) composite based cryogenic temperature sensor.

An aspect of the present disclosure provides a temperature sensor comprising: a substrate; and a composite film deposited onto said substrate, wherein the composite film comprises a reduced graphene oxide-nickel composite film.

In an embodiment, the substrate comprises ceramic ($Al_2O_3$) substrate. Alternatively, substrate made of any other material may be used so long the substrate serves its intended purpose as laid down in embodiments of the present disclosure.

In an embodiment, the temperature sensor is cryo-compatible. In an embodiment, the temperature sensor is a cryogenic temperature sensor. In an embodiment, the temperature sensor is a cryogenic resistance based temperature sensor. In an embodiment, the temperature sensor is a cryogenic resistance based NTC temperature sensor.

In an embodiment, the reduced graphene oxide-nickel composite film is screen printed onto said substrate. However, a person skilled in the art would appreciate that any other method for deposition of reduced graphene oxide-nickel composite film onto a substrate may be utilized so as to sub-serve its intended purpose as laid down in embodiments of the present disclosure without departing from the scope and spirit of the present invention.

In an embodiment, the composite film is further connected with a plurality of leads. In an embodiment, the plurality of leads are made of Indium. Alternatively, the leads may be made of any other conductive material. In an embodiment, the composite film is connected with said plurality of leads using a conductive silver epoxy resin. Alternatively, any other resin made of or including conductive material therein, so as to render it conductive and sub-serve its intended purpose may be suitably utilized. In an embodiment, connection between said composite film and said plurality of leads is further strengthened using a thermal epoxy resin.

In an embodiment, the temperature sensor includes a coating with any or a combination of a moisture-proofing material and a dielectric material. In an embodiment, the moisture-proofing material and the dielectric material comprise parylene. In an embodiment, the moisture-proofing material and the dielectric material comprise parylene C. However, a person skilled in the art would appreciate that any or a combination of moisture-proofing material and the dielectric material may be used to serve its intended purpose as laid down in embodiments of the present disclosure, without departing from the scope and spirit of the present invention.

In an embodiment, the reduced graphene oxide-nickel composite film has a thickness ranging from 5 μm to 200 μm. In an embodiment, the reduced graphene oxide-nickel composite film has a thickness of about 50 μm. In an embodiment, the reduced graphene oxide-nickel composite film has a width ranging from 0.05 mm to 2.5 mm. In an embodiment, the reduced graphene oxide-nickel composite film has a width of about 1 mm. In an embodiment, the reduced graphene oxide-nickel composite film has a length ranging from 0.1 mm to 10 mm. In an embodiment, the reduced graphene oxide-nickel composite film has a length of about 4 mm.

In an embodiment, the temperature sensor exhibits Temperature Coefficient of Resistance (TCR) ranging from $17.48\times10^{-3}$/K to $-148.10\times10^{-3}$/K. In an embodiment, the temperature sensor exhibits TCR of $-147.37\times10^{-3}$/K for a temperature below 10K. In an embodiment, the temperature sensor works at a temperature ranging from 400K to 2K. In an embodiment, the temperature sensor exhibits response time of 80 msec at a cryogenic temperature. In an embodiment, the temperature sensor consumes a current of about 1 μA across all temperature bands.

FIG. 1 illustrates an exemplary representation depicting the temperature sensor, realized in accordance with an embodiment of the present disclosure. As can be seen from the FIG. 1, the sensor 100 includes a substrate 102, a composite film 104 deposited onto said substrate 102, a plurality of leads 106a, 106b, 106c and 106d connected with the composite film 102 using a conductive resin and further strengthened using a thermal epoxy resin 108, and a coating of moisture-proofing and dielectric material 110.

The temperature sensor, realized in accordance with embodiments of the present disclosure, is a Resistive Temperature Detector (RTD) type, comprising reduced Graphene Oxide-Ni composite (referred to hereinafter alternatively and synonymously as RGO—Ni composite), as the sensing element. The Nickel content in the composite imparts RGO with high sensitivity towards change in temperature. With a temperature range of 2K-400K, the sensor exhibits sensitivity to a wide range of temperatures with enhanced responsiveness and resolution at temperatures below 100K. A high base resistance of 2 k Ohm coupled up with low current consumption of 1 μA across all temperature bands eliminates the concern of poor performance at ultralow temperatures due to self-heating, a problem associated with conventional temperature sensors (specifically, silicon diodes). Constant current consumption of about 1 μA across all temperature bands entails that the temperature sensor of the present disclosure doesn't require a variable current source, and hence, makes it eligible for usage in environments with rapidly changing temperature in real time for example, in space applications, aerospace applications and the likes. This is a significant improvement over the commercially available NTC temperature sensors like CERNOX® and silicon diodes, as it eliminates the need for a dynamic current source. Unlike the most commonly deployed CERNOX® temperature sensors, the temperature sensor of the present disclosure exhibits a standard curve, which ousts the need for individual calibration for each device. Further, the temperature sensor of the present disclosure can cater to the niche segment of temperature switches at cryogenic temperatures. The RGO—Ni composite as the temperature sensing element exhibits resistive switching ability at temperatures below 100K. This property can be exploited in applications demanding temperature switching capabilities at ultra-low temperatures. Further, the temperature sensor, realized in accordance with embodiments of the present disclosure, possesses an economic edge, as its fabrication doesn't require clean room facilities. Graphene oxide as used in the present disclosure can be conveniently prepared using the modified hummer's method as reported in Chen et al (Chen J, Zhang Y, Zhang M, Yao B, Li Y, Huang L, Li C, Shi G. *Water-enhanced oxidation of graphite to graphene oxide with controlled species of oxygenated groups*. Chemical Science. 2016, 7(3):1874-81), which is not only industrially scalable but also economically effective.

Another aspect of the present disclosure relates to a method of fabrication of a temperature sensor, the method comprising the steps of: taking graphene oxide; effecting reduction of graphene oxide using a reducing agent; effecting in-situ addition of nickel nanoparticles during the reduction of graphene oxide to realize a solution including reduced graphene oxide (rGO) and Ni nanoparticles; effecting deposition of said solution on a substrate such that a composite film is realized onto said substrate; and providing electrical connection with said composite film to realize the temperature sensor.

In an embodiment, the step of providing electrical connection with said composite film comprises: connecting a plurality of leads with said composite film; and strengthening the connection between said plurality of leads with said composite film. In an embodiment, said plurality of leads are connected with said composite film using a conductive silver epoxy resin. In an embodiment, the connection between said plurality of leads with said composite film is strengthened using a thermal epoxy resin.

In an embodiment, the method further comprises the step of coating the temperature sensor with any or a combination of a moisture-proofing material and a dielectric material. In an embodiment, the moisture-proofing material and the dielectric material comprise parylene. In an embodiment, the moisture-proofing material and the dielectric material comprise parylene C. However, a person skilled in the art would appreciate that any or a combination of moisture-proofing material and the dielectric material may be used to serve its intended purpose as laid down in embodiments of the present disclosure, without departing from the scope and spirit of the present invention.

In an embodiment, graphene oxide is synthesized by modified hummer's method. In an embodiment, the reducing agent is hydrazine hydrate. Alternatively, any other reducing agent may be used so long the same is compatible and sub-serves its intended purpose.

In an embodiment, the method further comprises the steps of: preparing a uniform solution of reduced graphene oxide (rGO) and Ni nanoparticles using a solvent; and homogenizing the uniform solution by ultrasonication to realize a homogenized solution before deposition thereof onto said substrate.

In an embodiment, the step of deposition of said solution onto said substrate comprises the steps of: realizing a pattern using said solution onto said substrate using a mask; and effecting annealing of said pattern effecting removal of solvent from said pattern to realize the composite film onto said substrate.

In an embodiment, the substrate comprises ceramic ($Al_2O_3$) substrate. In an embodiment, the pattern is realized onto said substrate by using screen printing technique. In an embodiment, the solvent is N-Methyl-2-pyrrolidone (NMP). Alternatively, any other solvent, as known to or appreciated by a person skilled in the art, may be used for preparing the solution including reduced graphene oxide (rGO) and Ni nanoparticles without departing from the scope and spirit of the present invention. In an embodiment, the plurality of leads are made of Indium. Alternatively, the leads may be made of any other conductive material. In an embodiment, the temperature sensor is a cryogenic temperature sensor. In an embodiment, the temperature sensor is cryo-compatible. In an embodiment, the temperature sensor is a cryogenic resistance based temperature sensor. In an embodiment, the temperature sensor is a cryogenic resistance based NTC temperature sensor. In an embodiment, the temperature sensor exhibits Temperature Coefficient of Resistance (TCR) ranging from $-17.48 \times 10^{-3}$/K to $-148.10 \times 10^{-3}$/K. In an embodiment, the temperature sensor exhibits Temperature Coefficient of Resistance (TCR) of $-147.37 \times 10^{-3}$/K for a temperature below 10K. In an embodiment, the temperature sensor works at a temperature ranging from 400K to 2K. In an embodiment, the temperature sensor exhibits response time of 80 msec at a cryogenic temperature.

Figure 2:
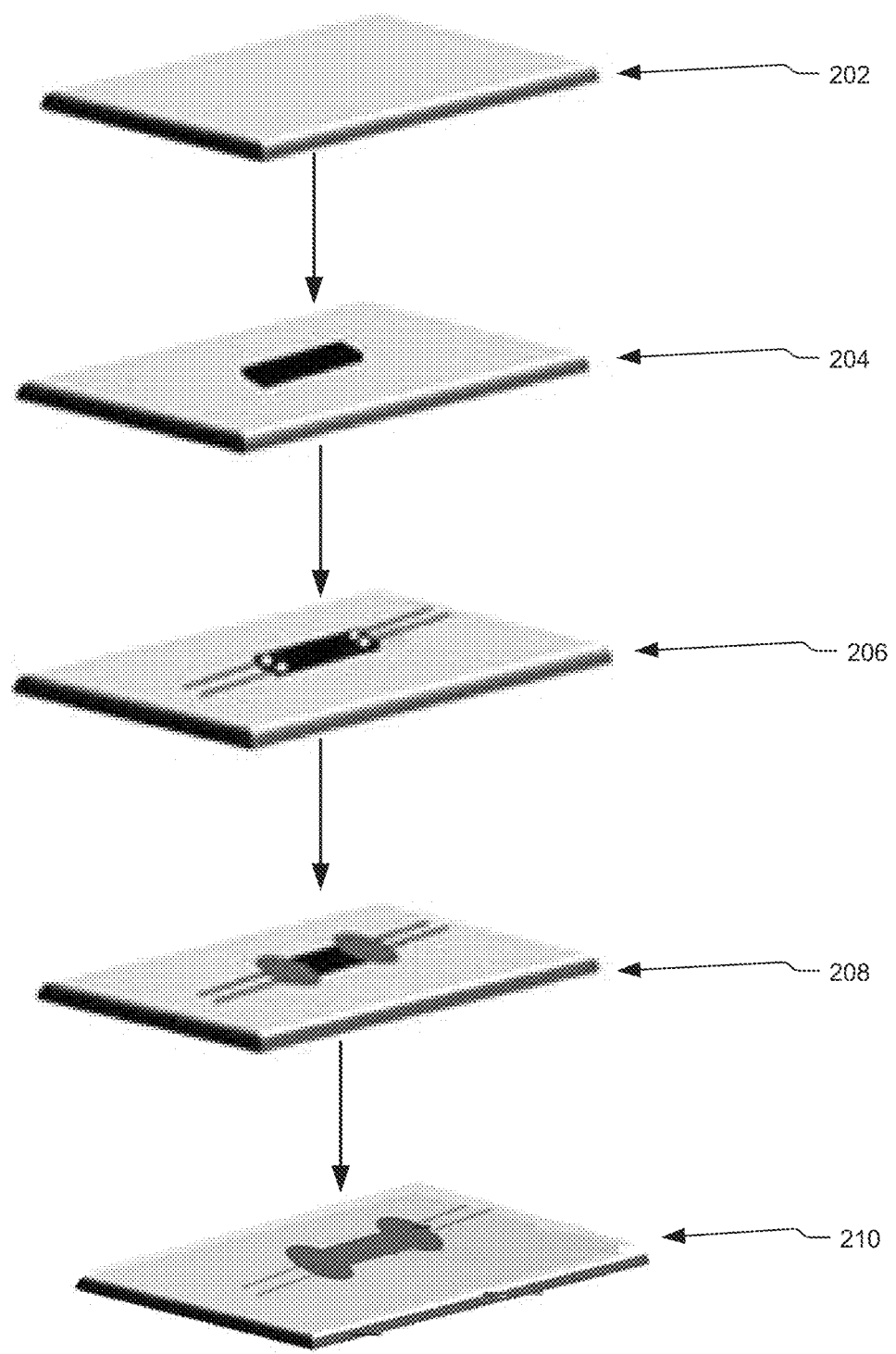
FIG. 2 illustrates an exemplary flow diagram depicting method of fabrication of the temperature sensor, in accordance with an embodiment of the present disclosure.

FIG. 2 illustrates an exemplary flow diagram depicting method of fabrication of the temperature sensor, in accordance with an embodiment of the present disclosure. As can be seen from the figure, at 202, a substrate is taken, at 204, deposition of reduced graphene oxide-nickel composite film onto said substrate is realized, at 206, leads are connected with the composite film, at 208, connection between the leads and composite film is strengthened using thermal epoxy resin, and at 210, a coating of Parylene is applied to realize the temperature sensor of the present disclosure Still further aspect of the present disclosure provides a cryo-thermal switch, characterized in that, the cryo-thermal switch comprises a reduced graphene oxide-nickel composite film.

Figure 3:
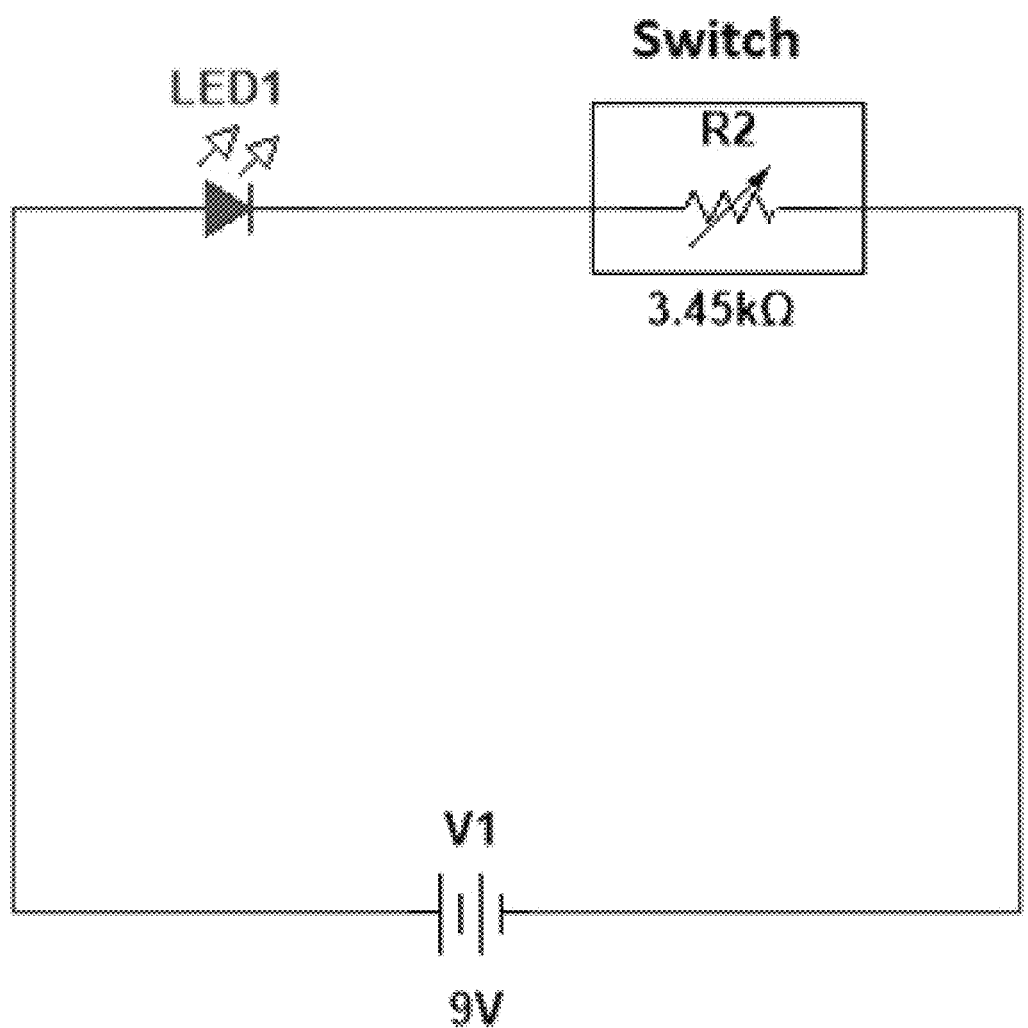
FIG. 3 illustrates an exemplary circuit diagram illustrating positioning of the cryo-thermal switch, in accordance with an embodiment of the present disclosure.

FIG. 3 illustrates an exemplary circuit diagram illustrating positioning of the cryo-thermal switch, in accordance with an embodiment of the present disclosure. With respect to working of the cryo-thermal switch in the illustrate circuit, when the sensor (reduced graphene oxide-nickel composite film based sensing element) is exposed to lower temperatures, its resistance increases exponentially leading to less drop across the diode causing the LED to turn OFF (i.e. a switching action).

The advantageous temperature sensor, realized in accordance with embodiments of the present disclosure, can find its utility in variety of application areas such as generation, storage and handling of liquefied gases, physics research, Hall Effect/Magnet studies, materials and metallurgical research, Thermal Gravimetric Analysis, Radio Astronomy, Ceramics research, Carbon research, Fuels research, Nuclear Magnetic Resonance (NMR), Cooling of special optical, x-ray and electron detectors, Flash freezing of food products, Vacuum degassing, processing, and testing, Low temperature research, Semiconductor laser development, Superconductor research & development, Tritium liquification, Nuclear physics detectors, but not limited thereto.

While the foregoing describes various embodiments of the disclosure, other and further embodiments of the disclosure may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

EXAMPLES

The present invention is further explained in the form of following examples. However, it is to be understood that the following examples are merely illustrative and are not to be taken as limitations upon the scope of the invention.

Example 1: Preparation of RGO—Ni Composition Film

Graphene oxide was synthesized by modified hummer's method—2 gm of graphite flakes was dispersed in 100 mL $H_2SO_4$ and 6 gm of $KMnO_4$ was added to it under constant stirring. 600 mL of DI water was then slowly added to it. The mixture was further treated with 60 mL of $H_2O_2$ and then ultrasonicated for 30 min. Finally, the precipitate was washed with DI water and HCl. The filtered GO (Graphene Oxide) was annealed at 80° C. and collected in the form of powder.

Nickel (Ni) nanoparticles were mixed in situ during the reduction of graphene oxide using hydrazine hydrate. Graphene Oxide (0.1 g) was dispersed in 100 mL of DI water and sonicated for an hour. The solution was transferred to round bottom flask. Ni (0.4 g) nano-particles dispersed in 50 ml of DI waster was added to the GO dispersion. 5 ml of $N_2H_4$ (hydrazine hydrate) was added and the solution was maintained at a temperature of 90° C. for 4 hours. Final product was washed with DI water, filtered and annealed to get RGO—Ni composite. A uniform solution of reduced graphene oxide (rGO) mixed with Ni nanoparticles was prepared using N-Methyl-2-pyrrolidone (NMP) as a solvent and homogenized by ultrasonication process to prepare a homogenous solution including reduced graphene oxide (rGO) and Ni nanoparticles.

Example 2: Deposition of the Composite Film onto a Substrate for Fabrication of a Temperature Sensor A metal mask was fabricated and used to realize desired pattern on a ceramic ($Al_2O_3$) substrate using screen printing technique i.e. pattern was created onto the substrate by using the homogenous solution including reduced graphene oxide (rGO) and Ni nanoparticles. The pattern was then annealed to remove NMP solvent. Four leads were taken out from the sensing film for four probe resistance measurement. Conductive silver epoxy was used to make proper contacts between the lead wire and film. Contact leads were further strengthened with the help of thermal epoxy. The sensor was then coated with parylene, a polymer layer that serves as a moisture proof and dielectric barrier.

Example 3: Characterization of RGO—Ni Composite Film

The temperature sensing element used in our device, RGO—Ni composite film, was subjected to characterization for their structural and functional analysis using standard techniques, them being: Xray Power Diffraction (XRD), Field Emission Scanning Electron (FE-SEM) and Raman Spectroscopy.

Figure 4:
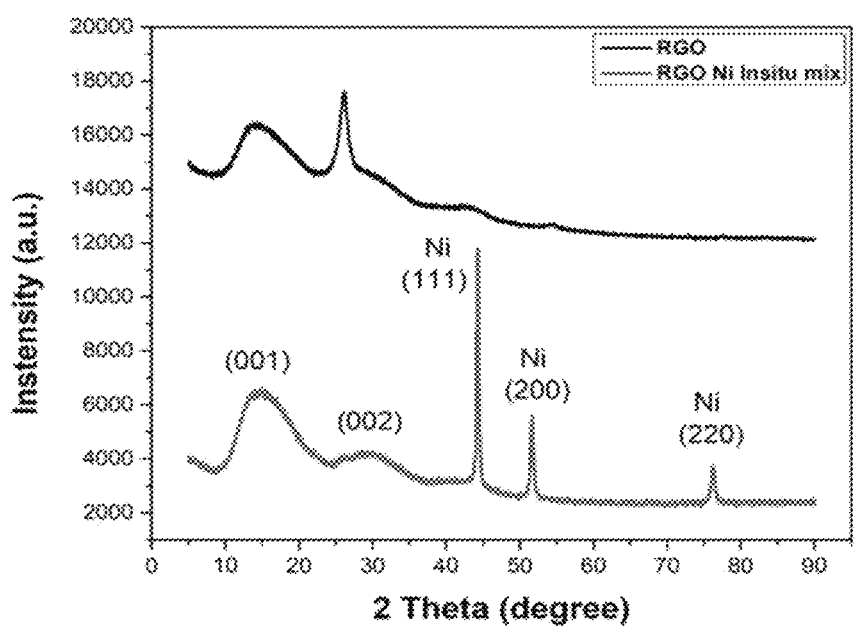
FIG. 4 illustrates an XRD pattern for RGO and RGO—Ni composite, in accordance with an embodiment of the present disclosure.

FIG. 4 illustrates a XRD pattern for RGO and RGO—Ni composite. The diffraction peaks at $2\theta=14.97°$ and $2\theta=28.44°$ correspond to (001) and (002) planes of RGO. Presence of oxygen containing group entailing a non-uniform RGO structure was confirmed by the broadening of the peaks. Existence of Nickel in the composite was established by observing three major peaks at 44.29°, 51.65° and 76.2°. These peaks refer to (111), (200) and (220) planes of face centred cubic structure of nickel, respectively.

Figure 5:
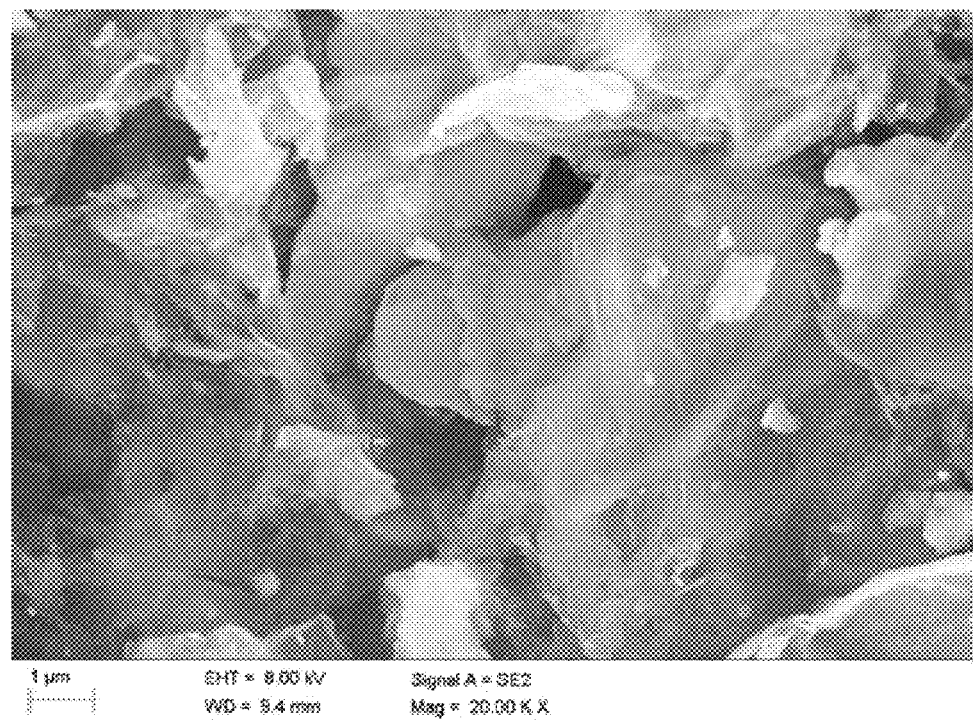
FIG. 5 illustrates a field emission scanning electron microscopy (FE-SEM) image of RGO—Ni composite, in accordance with an embodiment of the present disclosure.

Synthesized RGO and RGO—Ni composite were observed under field emission scanning electron microscopy (FE-SEM) (Carl Zeiss ULTRA 55). FESEM was performed over the RGO—Ni composite, as shown in FIG. 5. It could be observed that graphene sheets form a disordered structure due to their random aggregation. The thickness of the Graphene sheet was found to be of the order of 200 nm. It could be distinctly observed that RGO and Ni particles were homogeneously mixed without any cluster formation, as is evident from FIG. 5. These Nickel particles were responsible for exalting the sensitivity of the device (sensor).

Figure 6:
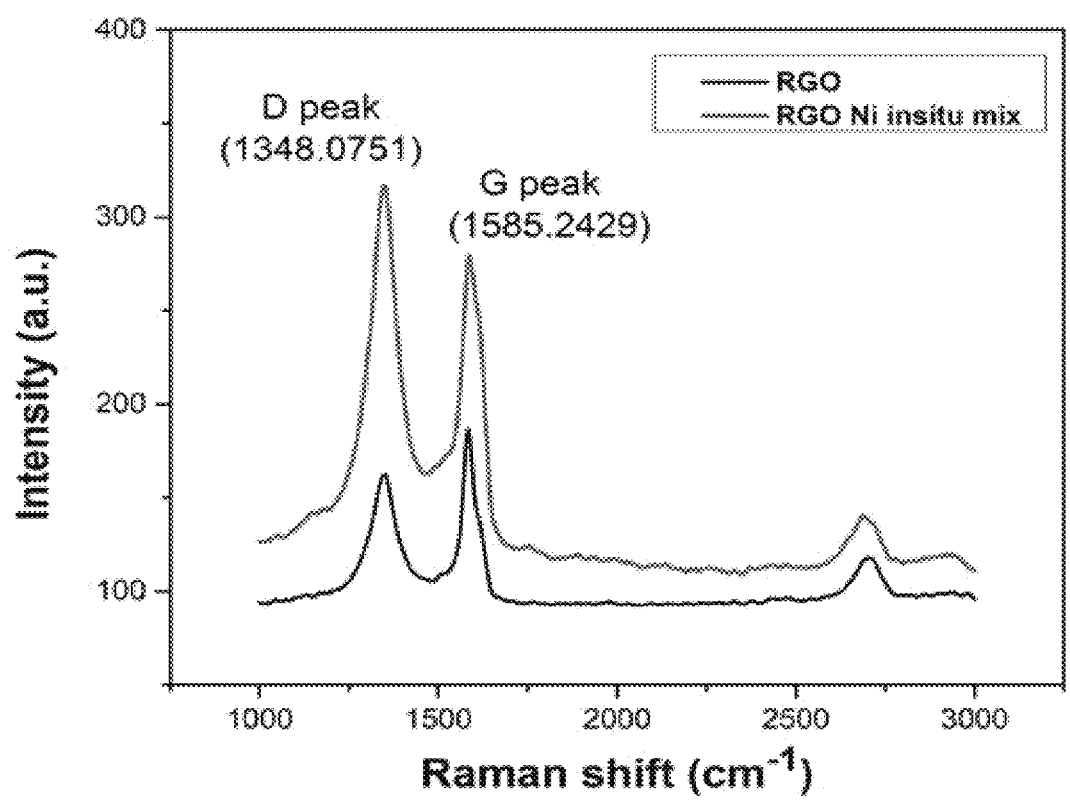
FIG. 6 illustrates room-temperature Raman spectra of Reduced Graphene oxide (RGO) and Graphene-Ni (RGO—Ni) composite, in accordance with an embodiment of the present disclosure.

Raman Spectroscopy was employed to determine the $sp^2$ hybridization of graphene. The room-temperature Raman spectra of Graphene oxide and Graphene-Ni composite is illustrated in FIG. 6. The spectrum evinces out the characteristic D and G graphitic peaks at 1348.0751 $cm^{-1}$ and 1585.2429 $cm^{-1}$, respectively. The G peak was used to determine the degree of ordered graphitized carbon and the D peak denote presence of disorder in the carbon layers. The observed G line can be attributed to the first order scattering of the $E_{2g}$ phonon vibration mode of $sp^2$ bonded C atoms, while the D line refers to the breathing mode of the k-point phonons of $A_{1g}$ Symmetry.

Example 4: Temperature Response Measurements

Figure 7A:
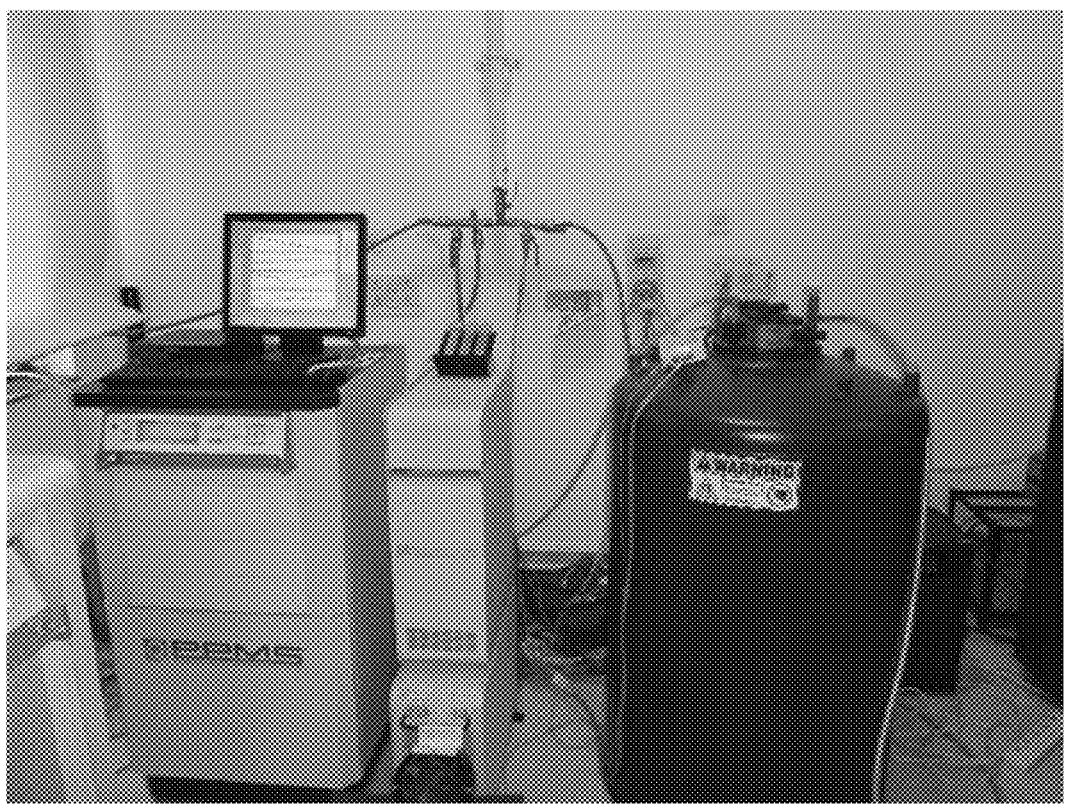
FIG. 7A illustrates an experimental setup having a control unit and a helium refrigerator for measuring the performance characteristics of the temperature sensor, in accordance with an embodiment of the present disclosure.
Figure 7B:
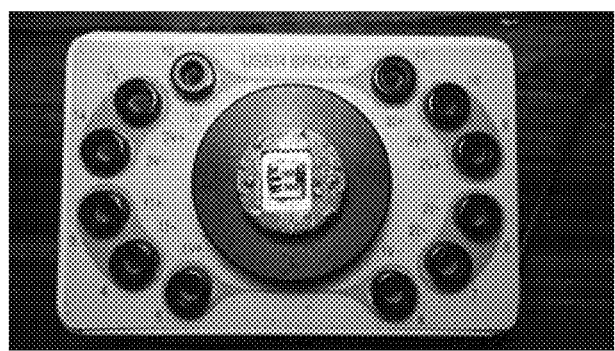
FIG. 7B illustrates the placement of sensor on a sample mount, as part of the experimental setup shown in FIG. 7A for measuring the performance characteristics of the temperature sensor, in accordance with an embodiment of the present disclosure.

Performance of the fabricated sensor was studied using Physical Property Measurement System (PPMS) from Quantum Design. FIG. 7A illustrates an experimental setup having a control unit and a helium refrigerator. This completely automated set up having a temperature range of 2K-400K is best suited for temperature response measurements. The sensor was placed on the sample mount (shown in FIG. 7B) and resistance change was monitored with variation in temperature. Resistance of the sensing film was measured using four-wire measurement at 1 µA DC excitation.

Figure 8:
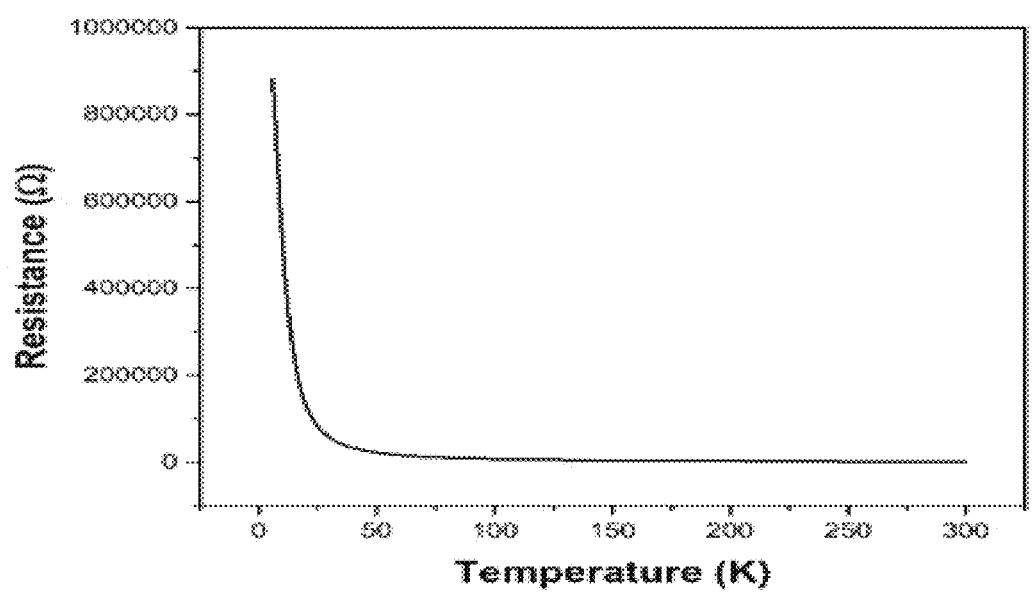
FIG. 8 illustrates a resistance vs temperature plot for the temperature sensor, in accordance with an embodiment of the present disclosure.

To study the temperature response of the fabricated sensor, change in resistance of the sensing element was measured as a function of temperature in the range 300K to 6K. FIG. 8 shows resistance vs temperature plot for the sensor. It could be observed that resistance increases with decrease in temperature, exhibiting negative temperature coefficient of resistance (NTC) behaviour like graphene/reduced graphene oxide sensors as reported in literature (Khurana et al., Reduced Graphene Oxide as an Excellent Temperature Sensor; J Nanosci Nanotechnol, 2018, 2: 101). Addition of Nickel nanoparticles plays a pivotal role in increasing the sensitivity of sensor. Though the sensor response was non-linear, there was a two-order increase in output response compared to the values previously reported by Khurana et al. (Reduced Graphene Oxide as an Excellent Temperature Sensor; J Nanosci Nanotechnol, 2018, 2: 101).

Figure 9A:
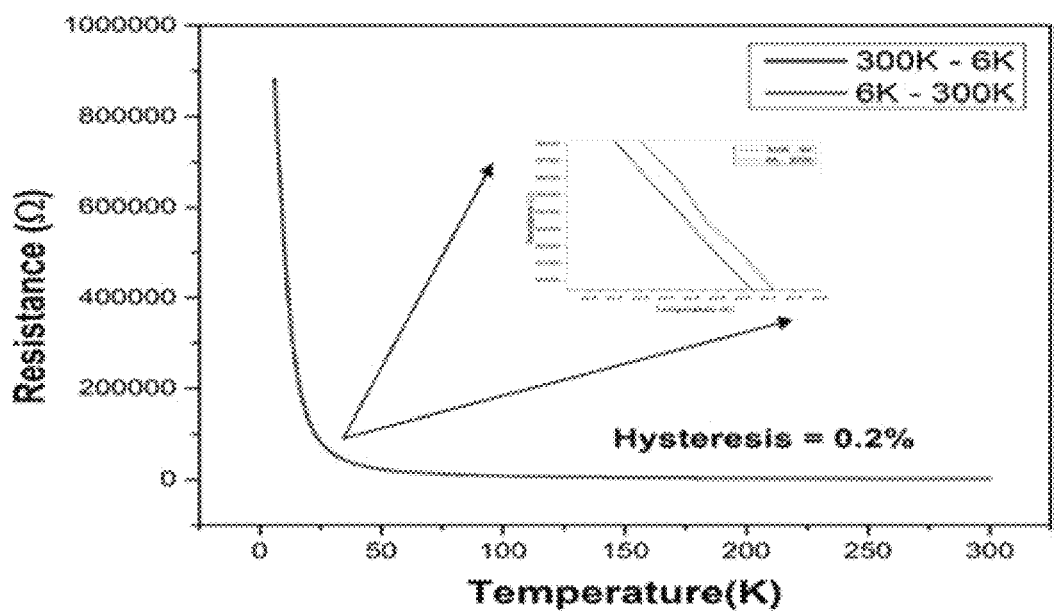
FIG. 9A and FIG. 9B illustrate Resistance VS Temperature plots showing hysteresis and repeatability for the temperature sensor, in accordance with an embodiment of the present disclosure.
Figure 9B:
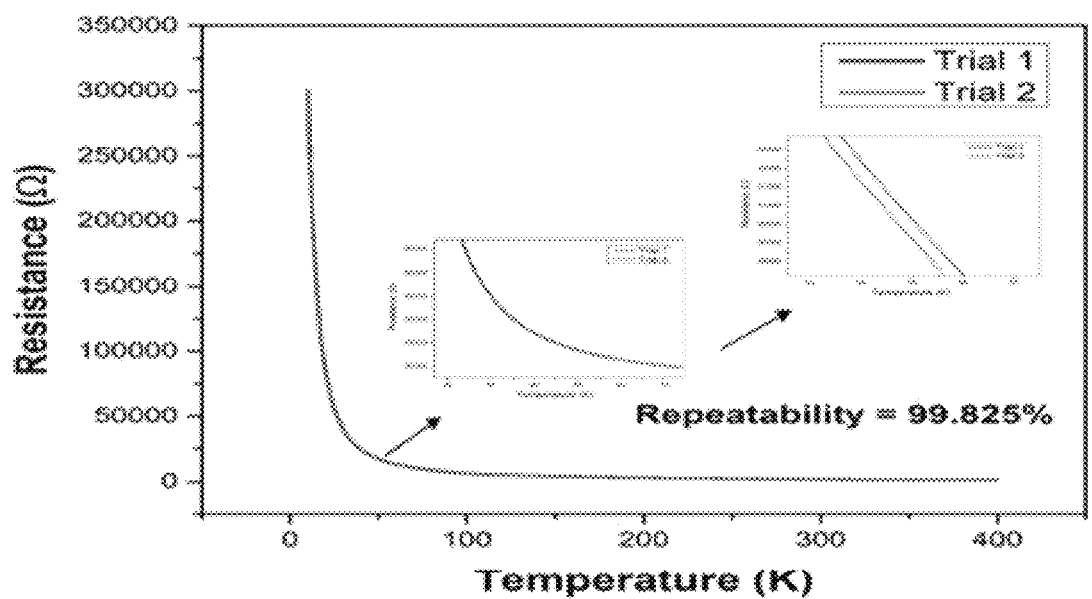
Figure 10A:
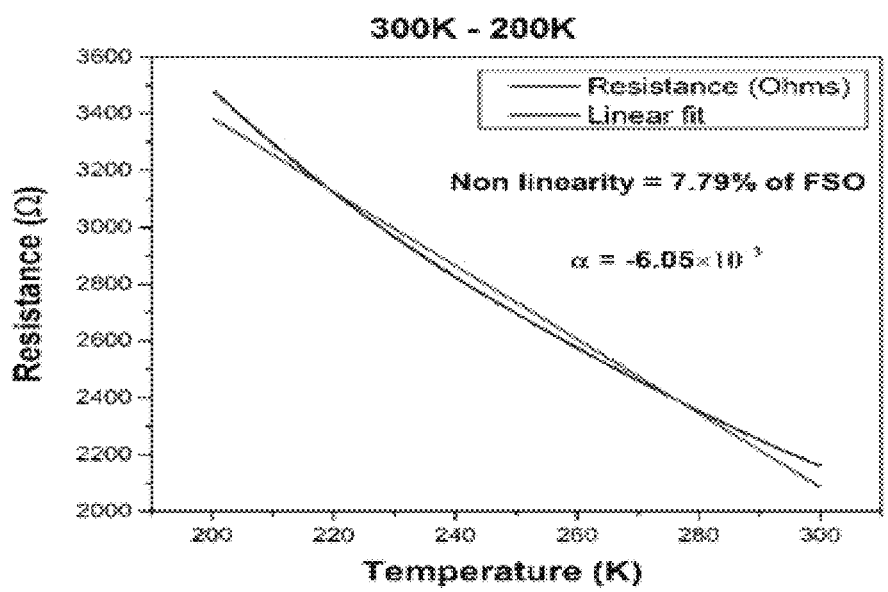
FIG. 10A through FIG. 10E illustrate Resistance VS Temperature plots at different temperatures with non-linearity and TCR values at these temperatures, in accordance with an embodiment of the present disclosure.
Figure 10B:
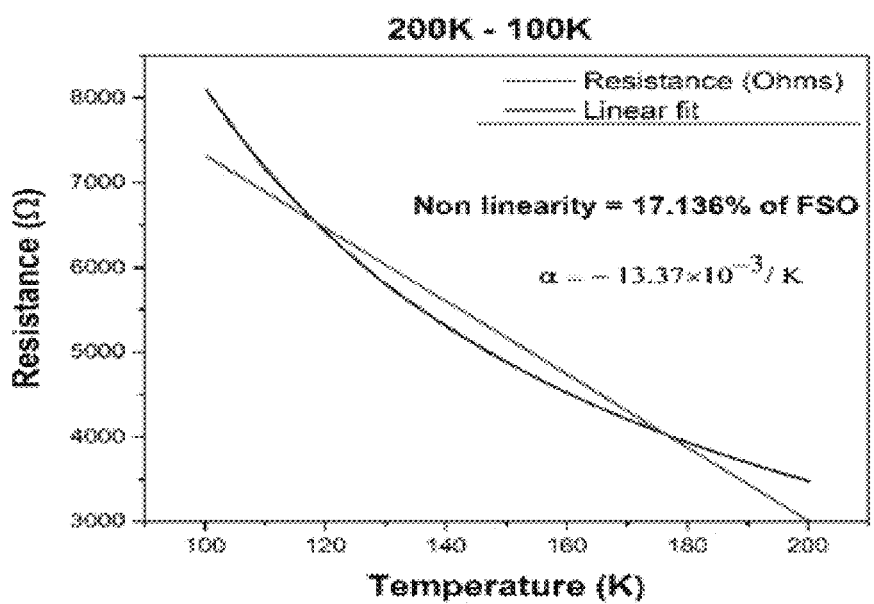
Figure 10C:
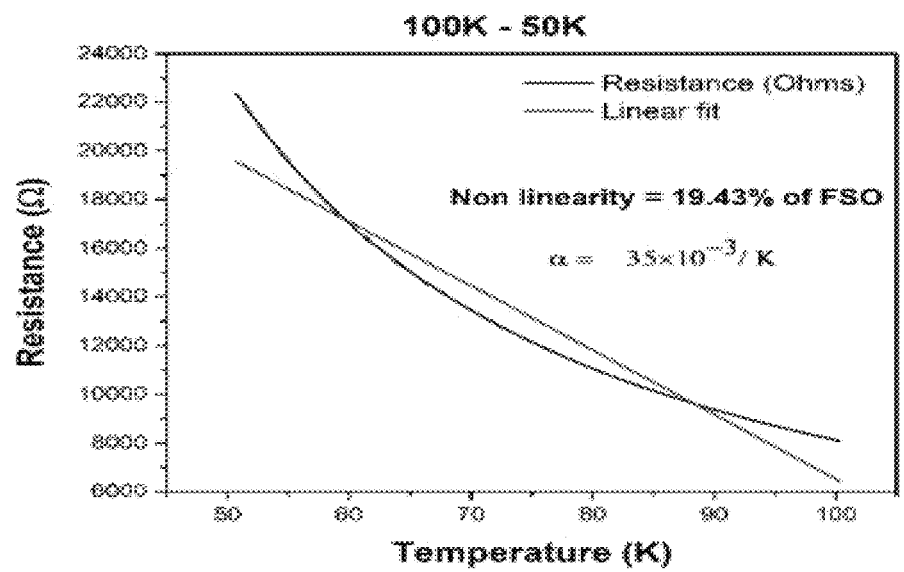
Figure 10D:
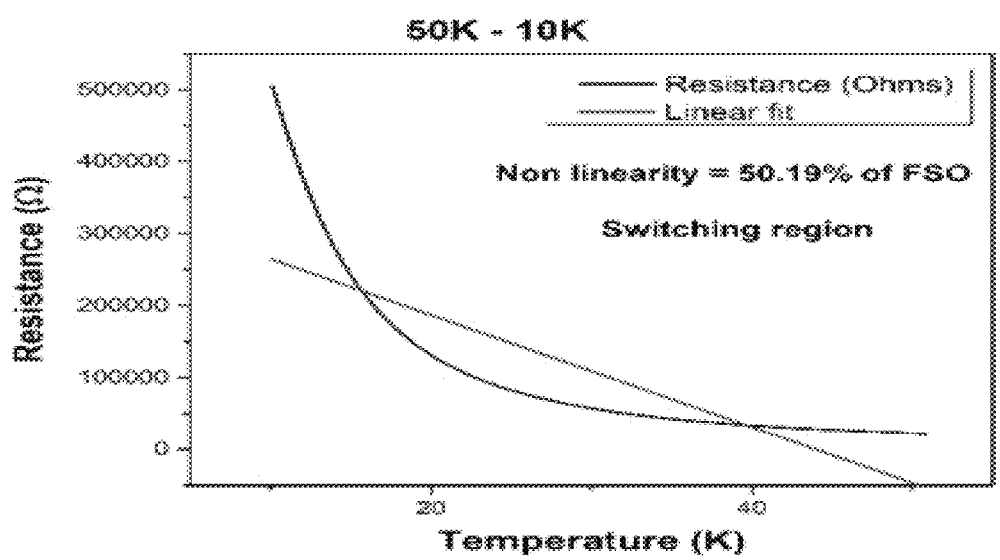
Figure 10E:
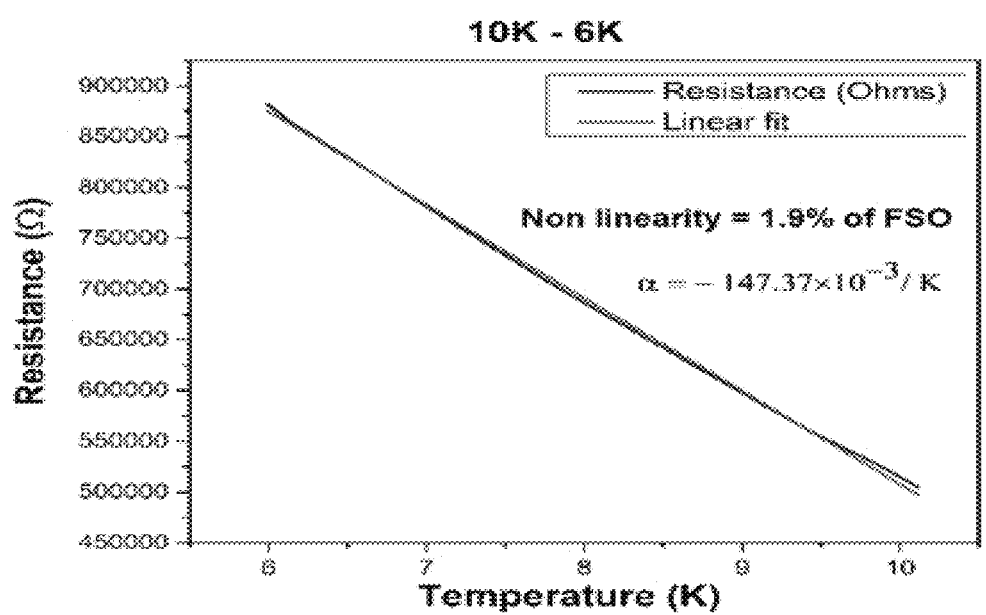

Sensor performance was tested for a number of cycles and was found to be highly repeatable with repeatability of 99.825% with negligible hysteresis of 0.2%, as can be seen from the Resistance VS Temperature plots illustrated in FIG. 9A and FIG. 9B. The R-T response curve of the sensor was found to be well fitted with following equation—

$$R(T)=a*e^{b*T}+c*e^{d*T}$$

Where, a=2.904e+06, b=−0.1972, c=1.709e+05 and d=−0.04108

Temperature Coefficient of Resistance (TCR) was calculated using the equation $$\alpha = \frac{1}{R}\frac{dR}{dT}$$

Total response of the sensor was split into different parts as the outcome was found to be linear in some sections. Nonlinear dependence of resistance to temperature resulted in various TCR values at different range of temperatures, as can be observed from R-T response curves shown as FIG. 10A through FIG. 10E. It could be observed that TCR is very high at lower temperature range.

Example 5: Response Time Measurements

Figure 11:
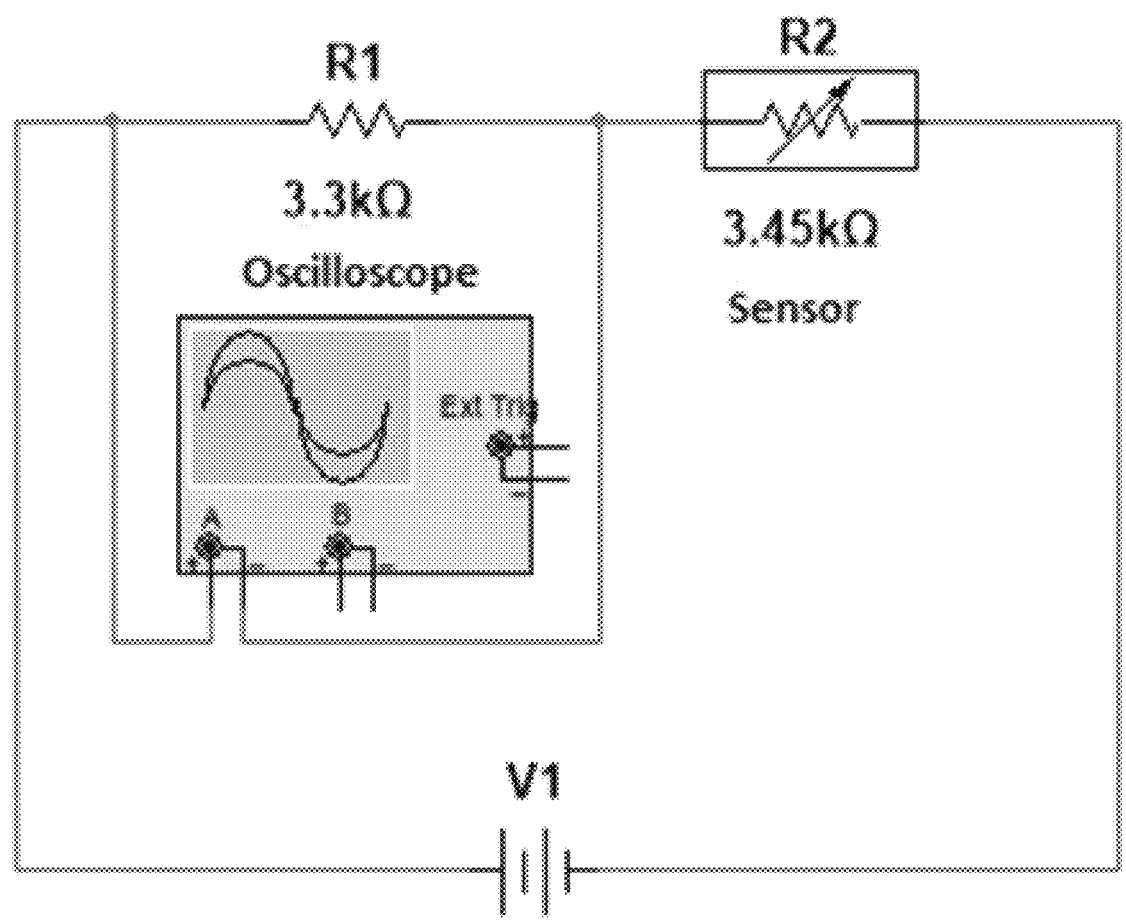
FIG. 11 illustrates a circuit connection for response time measurement of the temperature sensor, in accordance with an embodiment of the present disclosure.

Response time of the temperature sensor was calculated by two methods—dripping hot water on the sensor and dripping liquid $N_2$ drops on the sensor, separately. The sensor was connected in a circuit as shown in FIG. 11. When the sensor was subjected to temperature variations, voltage drop across fixed resistor value (3.3KΩ) changed, which was recorded using GW Instek digital oscilloscope. Sensor resistance values were thus calculated from the recorded voltage readings using Ohm's law.

Figure 12A:
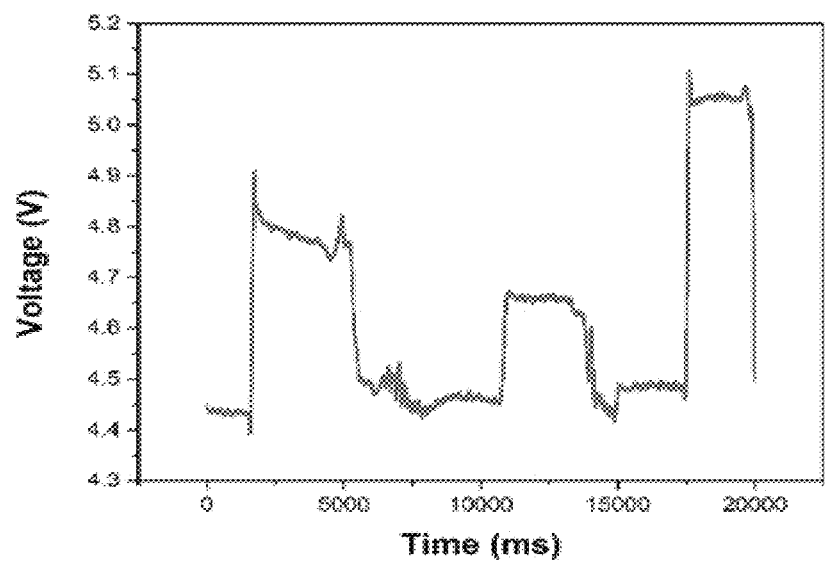
FIG. 12A and FIG. 12B illustrate oscilloscope reading for hot water dropping and liquid N2 dropping, respectively, in accordance with an embodiment of the present disclosure.
Figure 12B:
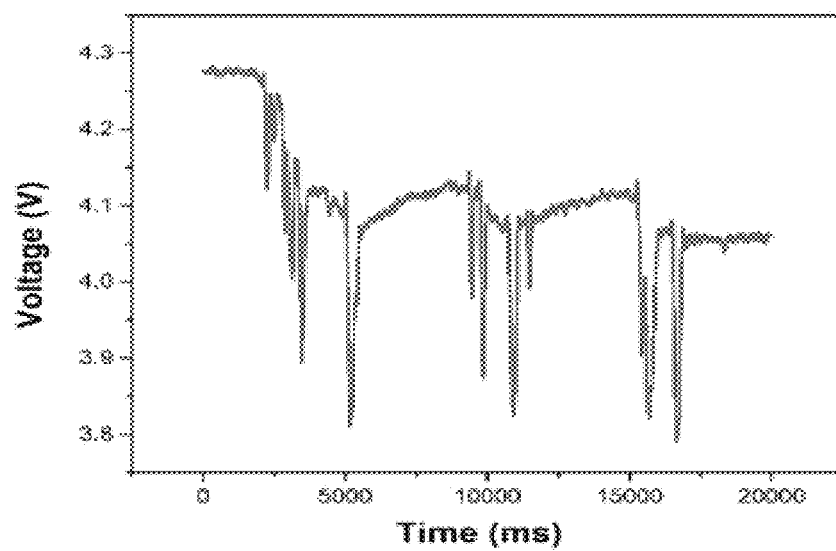
Figure 12C:
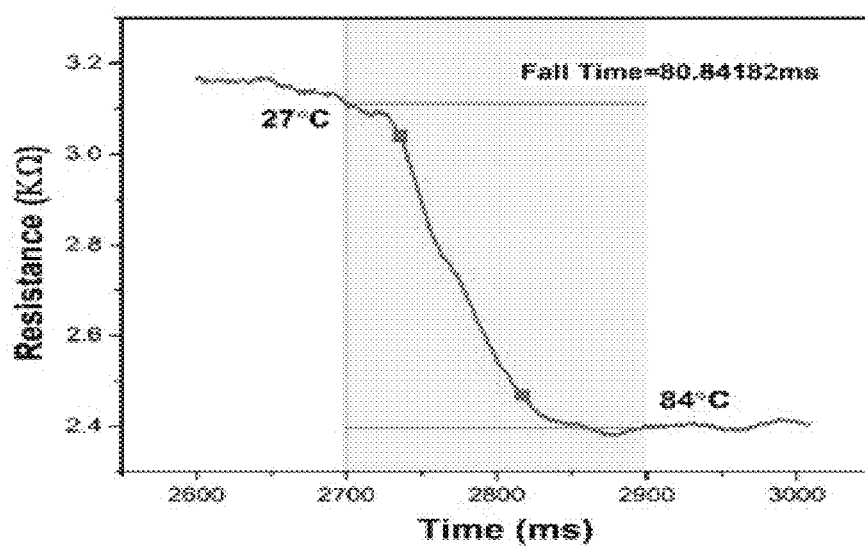
FIG. 12C and FIG. 12D illustrate sensor response time plots in terms of change in resistance, in accordance with an embodiment of the present disclosure.
Figure 12D:
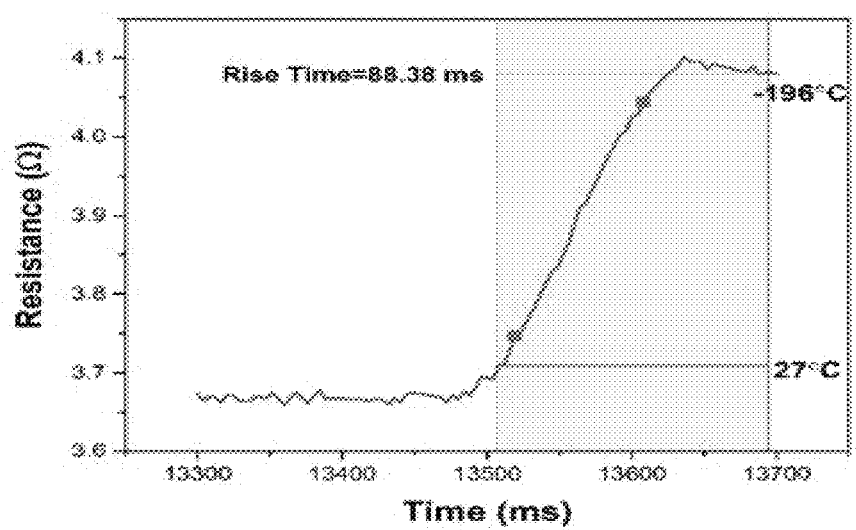

FIG. 12A and FIG. 12B illustrate oscilloscope reading for hot water dropping and liquid $N_2$ dropping, respectively. Narrow pulses in the graph indicate number of drops being (jumping) dropped repeatedly. FIG. 12C and FIG. 12D illustrate sensor response time plots in terms of change in resistance. The sensor response was found to be around 80 ms in both the cases which indicate quick response at lower temperatures, better than the values as previously reported by Sahoo et al (Reduced graphene oxide as ultra-fast temperature sensor, arXiv preprint arXiv: 1204.1928. 2012 Apr. 9).

Example 6: Life Cycle Test

Figure 13:
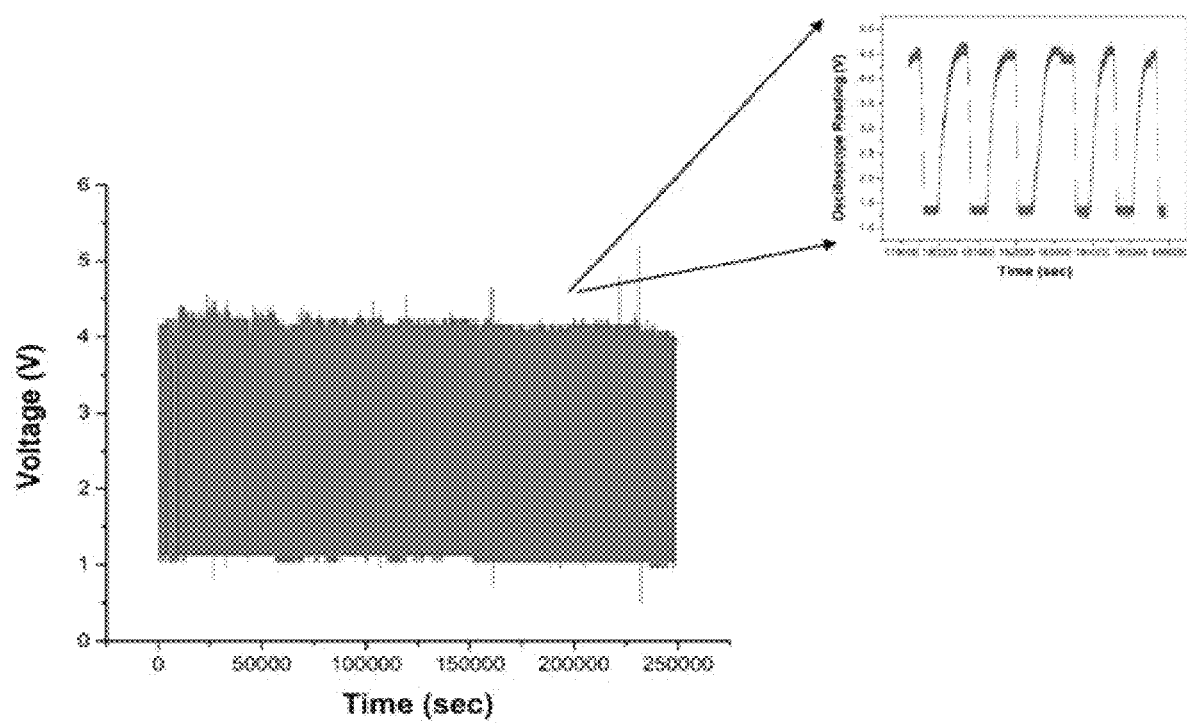
FIG. 13 illustrates plot depicting recorded change in voltage across the temperature sensor as observed on the oscilloscope for 1000 cycles, in accordance with an embodiment of the present disclosure.

The temperature sensor was subjected to life cycle test by dipping it in liquid $N_2$ for more than 1000 times. FIG. 13 illustrates plot depicting recorded change in voltage across the temperature sensor as observed on the oscilloscope for 1000 cycles. As can be seen from the plots, performance of the sensor was observed to be consistent. It could be observed that resistance of the composite film before life cycle test was 3.701KΩ and resistance of the composite film after life cycle test was 4.131KΩ. Further, the temperature sensor survived 1000 cycles of dipping in $N_2$ without any failure or damage thereto.

Example 7: Comparative Example—Mechanically Mixed RGO—Ni Based Sensor

To understand the differences between the sensor that includes a composite film having mechanically mixed (i.e. physical mixture) reduced graphene oxide and nickel nanoparticles and the sensor of the present disclosure that includes a composite film having nickel nanoparticles in-situ mixed during the reduction of graphene oxide, a temperature sensor including a composite film having mechanically mixed reduced graphene oxide and nickel nanoparticles was prepared using the following method.

Graphene oxide (GO) was synthesized by modified hummer's method—2 gm of graphite flakes was dispersed in 100 mL $H_2SO_4$ and 6 gm of $KMnO_4$ was added to it under constant stirring. 600 mL of DI water was then slowly added to it. The mixture was further treated with 60 mL of $H_2O_2$ and then ultrasonicated for 30 min. Finally, the precipitate was washed with DI water and HCl. The filtered GO (Graphene Oxide) was annealed at 80° C. and collected in the form of powder. 0.3 g of GO was dispersed in DI water through ultrasonication process. The solution was then transferred to round bottom flask. 9 mL of hydrazine hydrate was added under constant stirring. The solution was maintained at a temperature 90° C. for 4 hours. The reduced graphene oxide (RGO) was then collected through filtration and annealed at 80° C. for 2 hours. RGO and Nickel (Ni) nanoparticles were mixed in predefined weight ratio using N-Methyl-2-pyrrolidone (NMP) as solvent. The mixture was sonicated for an hour to get uniform dispersion.

Figure 14A:
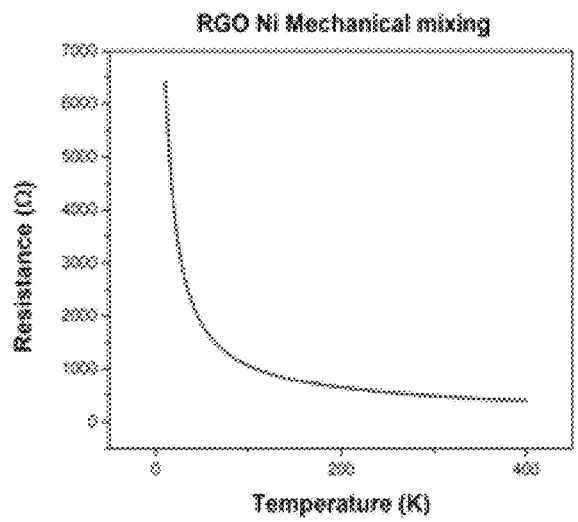
FIG. 14A illustrates resistance vs temperature response of mechanically mixed RGO—Ni sensor fabricated on ceramic substrate subjected to cryogenic temperature, in accordance with an embodiment of the present disclosure.
Figure 14B:
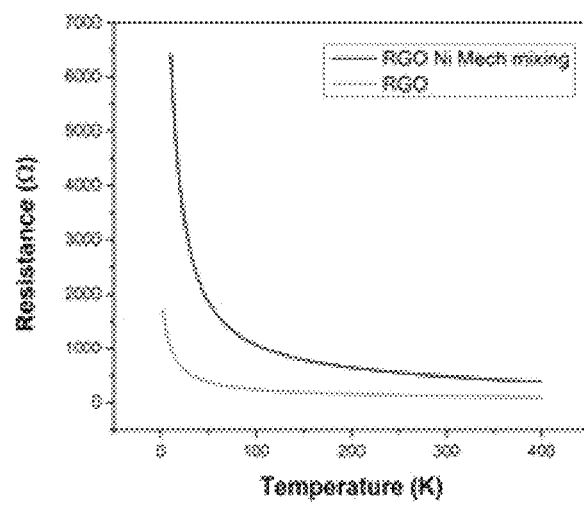
FIG. 14B illustrates resistance vs temperature response of mechanically mixed RGO—Ni sensor in comparison to in-situ mixed RGO—Ni based sensor, both fabricated on ceramic substrates and subjected to cryogenic temperature, in accordance with an embodiment of the present disclosure.
Figure 14C:
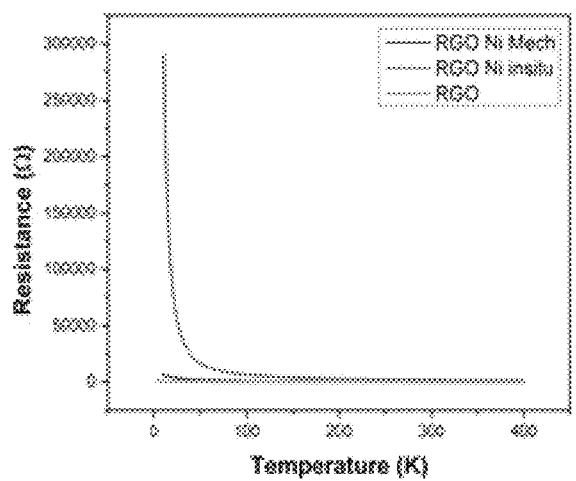
FIG. 14C indicates the comparative response of RGO alone (i.e. devoid of Ni), RGO—Ni mechanically mixed and RGO—Ni in-situ mixed sensors, in accordance with an embodiment of the present disclosure.
Figure 15:
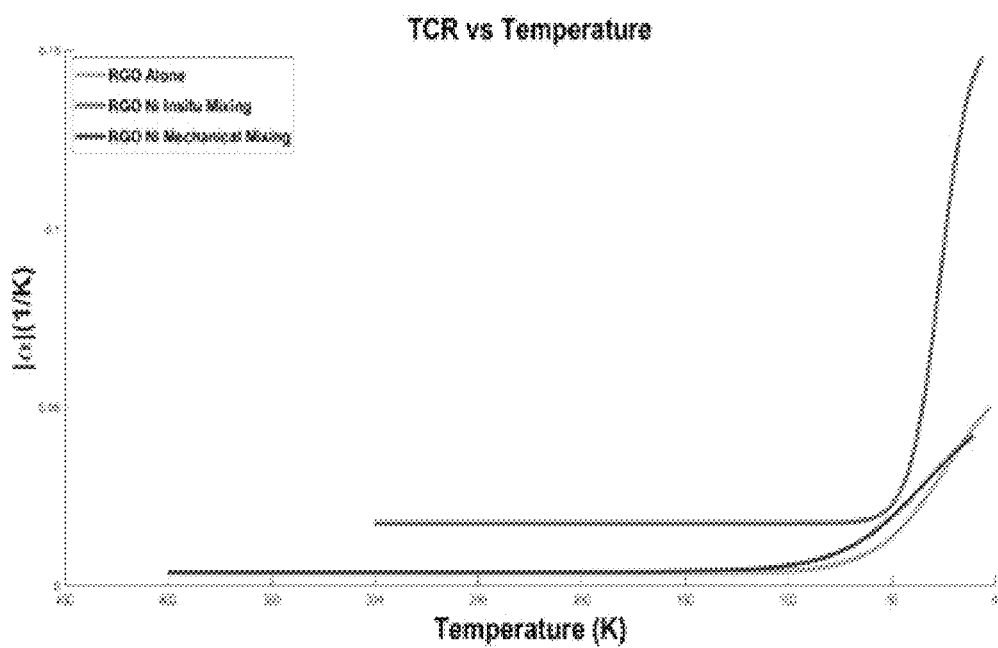
FIG. 15 illustrates TCR vs temperature curves for different samples—RGO alone, RGO—Ni mechanically mixed and RGO—Ni in-situ mixed sensors depicting their sensitivity to cryogenic temperatures, in accordance with an embodiment of the present disclosure.

FIG. 14A illustrates resistance vs temperature response of mechanically mixed RGO—Ni sensor fabricated on ceramic substrate subjected to cryogenic temperature. Addition of Ni particles increases the temperature response of the device compared to the device fabricated only using RGO. This can be visualized from FIG. 14B. FIG. 14C indicates the comparative response of RGO alone (i.e. devoid of Ni), RGO—Ni mechanically mixed and RGO—Ni in-situ mixed sensors. The response of in-situ mixed composite based sensor was found to be far more superior in comparison to others, justifying the fact that in-situ method of mixing yields better composite than mechanical mixing. FIG. 15 illustrates TCR vs temperature curves for different samples—RGO alone, RGO—Ni mechanically mixed and RGO—Ni in-situ mixed sensors, depicting their sensitivity to cryogenic temperatures. The value of TCR for in-situ mixed composite based sensor was found to be drastically increasing at cryo-temperature compared to others.

The change in electronic and structural properties of graphene and metal nanoparticles were investigated using first principle Density-Functional Theory (DFT) calculations (Subrahmanyam et al, A study of graphene decorated with metal nanoparticles, Chemical Physics Letters. 2010 Sep. 10; 497(1-3):70-5). From the available literature, it could be inferred that there is an effective charge transfer between metal nanoparticles and graphene. The mechanism of charge transfer is mainly due to Coulombic forces as observed in single-walled carbon nanotubes (SWNTs) interacting with metal nanoclusters and electron donor/acceptor adsorbed on SWNTs and graphene (Manna A K, Pati S K, Doping single-walled carbon nanotubes through molecular charge-transfer: a theoretical study. Nanoscale. 2010, 2(7): 1190-5; Manna A K, Pati S K, Tuning the electronic structure of graphene by molecular charge transfer: a computational study, Chemistry—An Asian Journal. 2009 Jun. 2, 4(6):855-60). The charge transfer itself is directly proportional to electron affinity and ionization energy of the metal particle. Changes in electronic band structure of graphene leads to the enhanced temperature response of the composite material. The significant electronic interaction between metal particle and graphene may give rise to change in Raman spectrum of graphene as explained below.

Figure 16:
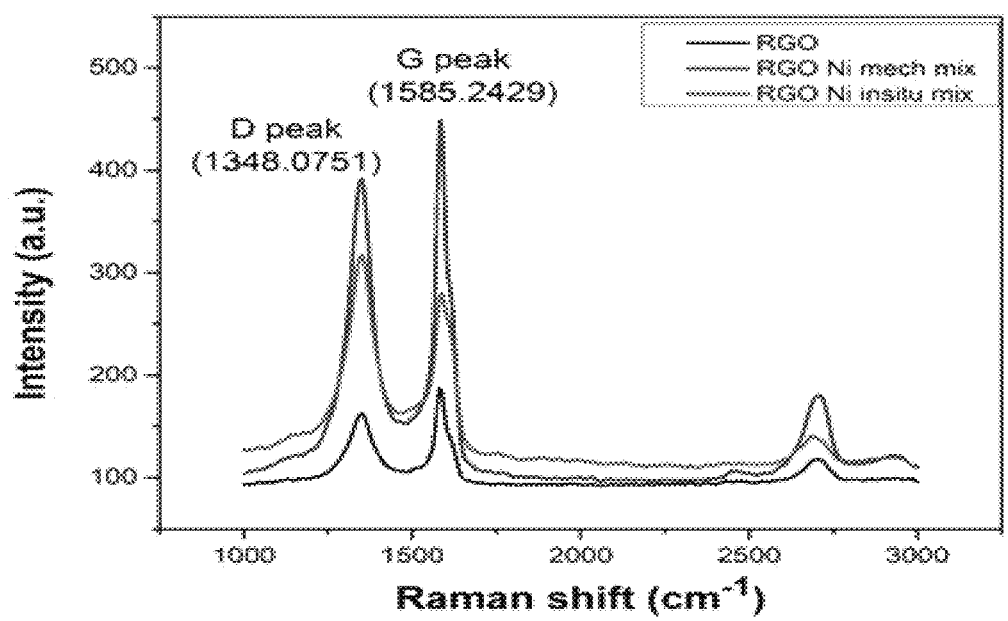
FIG. 16 illustrates room-temperature Raman spectra of RGO (reduced graphene oxide alone), RGO—Ni mechanically mixed composite and RGO—Ni in-situ mixed composite, in accordance with an embodiment of the present disclosure.

The room-temperature Raman spectra of RGO (reduced graphene oxide alone), RGO—Ni mechanically mixed composite and RGO—Ni in-situ mixed composite are illustrated in FIG. 16. The spectrum evinces the characteristic D and G graphitic peaks at 1348.0751 $cm^{-1}$ and 1585.2429 $cm^{-1}$ respectively. The G peak was used to determine the degree of ordered graphitized carbon while the D peak denoted the presence of disorder in carbon layers. The Raman spectrum of in-situ mixed graphene Ni composite showed no shift in peak position; however, a significant increase in the D/G intensity ratio was observed, reflecting a weakened $sp^2$ hybridization and a comparatively strengthened $sp^3$-bonded carbon, probably due to hybridization of Ni d orbitals with carbon π orbitals on the graphene surface (Zhou C, Szpunar J A, Cui X. Synthesis of Ni/graphene nanocomposite for hydrogen storage. ACS applied materials & interfaces. 2016 Jun. 10; 8(24):15232-41). Whereas D/G intensity ratio for mechanical mixing remained same as that of RGO suggesting that there was not much influence of Ni on the chemical structure of graphene.

Figure 17:
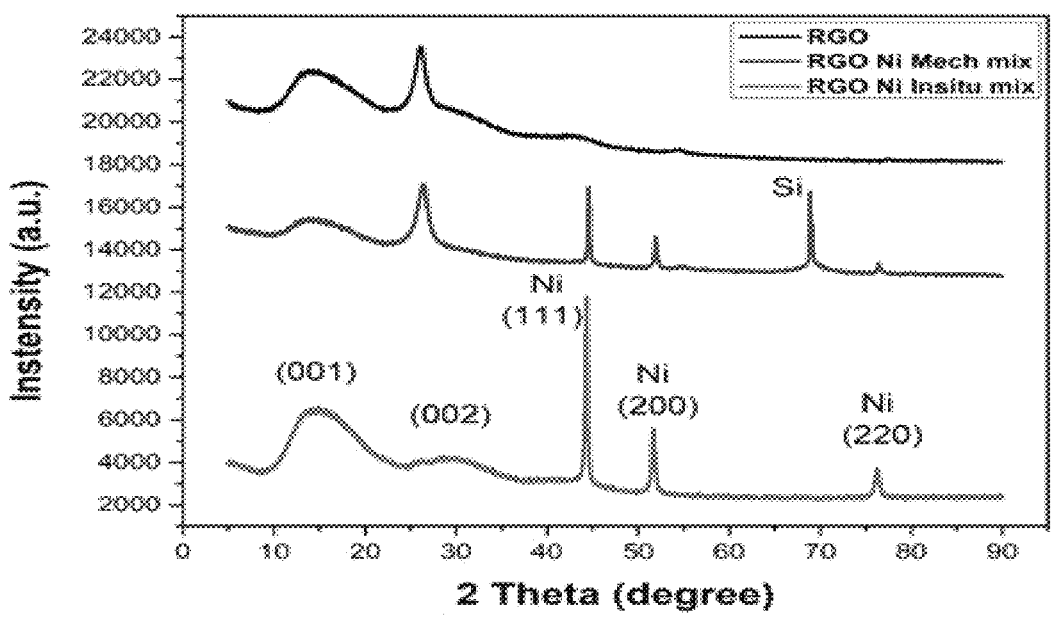
FIG. 17 illustrates XRD pattern for RGO, RGO—Ni mechanically mixed composite and RGO—Ni in-situ mixed composite, in accordance with an embodiment of the present disclosure.

FIG. 17 illustrates XRD pattern for RGO, RGO—Ni mechanically mixed composite and RGO—Ni in-situ mixed composite. The diffraction peaks at 2θ=14.97° and 2θ=28.44° correspond to (001) and (002) planes of RGO. Presence of oxygen containing group entailing a non-uniform RGO structure was confirmed by the broadening of the peaks. Existence of Nickel in the composite was established by observing three major peaks at 44.29°, 51.65° and 76.2°. These peaks refer to (111), (200) and (220) planes of face centered cubic structure of nickel, respectively. Nickel peaks in in-situ mixing were found to have stronger intensities than the mechanical mixing, indicating increase in concentration and the degree of crystallinity of Ni nanoparticles (Wang et al., Synthesis and microwave absorption properties of graphene/nickel composite materials. Applied Physics A. 2015 Mar. 1; 118(3):1053). The (002) peak for in-situ mixing being very broad suggested that the graphene oxide had not been completely reduced into RGO due to the presence of Nickel particles during the reduction process. In mechanical mixing, since the Ni particles were added to graphene oxide after reduction, there was a strong (002) peak present at 2θ=28.44°.

The aforesaid experimental details evidentially proves that the temperature sensor including reduced graphene oxide-Ni nanoparticles based composite film, made by in-situ mixing of Ni nanoparticles during reduction of the graphene oxide exhibits superior performance characteristics as compared to the conventional sensors, while being perfectly suited for cryo-temperature applications owing to its very high sensitivity and TCR.

The foregoing examples are merely illustrative and are not to be taken as limitations upon the scope of the invention. Various changes and modifications to the disclosed embodiments will be apparent to those skilled in the art. Such changes and modifications may be made without departing from the scope of the invention.

Advantages of the Present Invention

The present disclosure overcomes disadvantages associated with conventional temperature sensors.

The present disclosure provides a Resistive Temperature Detector (RTD) type temperature sensor.

The present disclosure provides a method of fabrication of a Resistive Temperature Detector (RTD) temperature sensor.

The present disclosure provides a Resistive Temperature Detector (RTD) type temperature sensor that exhibits high sensitivity.

The present disclosure provides a temperature sensor that doesn't require a variable current source.

The present disclosure provides a temperature sensor that obviates the need of individual calibration for each device.

The present disclosure provides a temperature sensor that exhibits resistive thermal switching at temperatures below 100K.

The present disclosure provides a temperature sensor that is economical.

The present disclosure provides a temperature sensor that exhibits low current consumption, eliminating self-heating at low temperatures.

The present disclosure provides a temperature sensor that exhibits constant current consumption of about 1 µA across all temperature bands obviating the need of dynamic current source.

We claim:

1. A highly sensitive fast response cryogenic temperature sensor comprising: a substrate; and a composite film deposited onto said substrate, wherein the composite film is further connected with a plurality of leads, characterized in that the composite film comprises an in-situ formed reduced graphene oxide-nickel composite, wherein the in-situ formed reduced graphene oxide-nickel composite has a D/G intensity ratio on a Raman spectrum of greater than 1, and wherein the D/G intensity ratio is the ratio of a D peak intensity at about 1348 $cm^{-1}$ to a G peak intensity at about 1585 $cm^{-1}$ on the Raman spectrum.

2. The temperature sensor as claimed in claim 1, wherein the substrate is ceramic Al2O3.

3. The temperature sensor as claimed in claim 1, wherein the composite film is screen printed onto said substrate.

4. The composite film as claimed in claim 1 wherein the plurality of leads is made of Indium.

5. The composite film as claimed in claim 1 wherein the composite film is connected with said plurality of leads using a conductive silver epoxy resin.

6. The composite film as claimed in claim 1 wherein connection between said composite film and said plurality of leads is further strengthened using a thermal epoxy resin.

7. The temperature sensor as claimed in claim 1, wherein the in-situ formed reduced graphene oxide-nickel composite film has a thickness ranging from 5 µm to 200 µm, preferably of about 50 µm; width ranging from 0.05 mm to 2.5 mm, preferably of about 1 mm; and length ranging from 0.1 mm to 10 mm, preferably of about 4 mm.

8. The temperature sensor as claimed in claim 1, wherein the temperature sensor includes a coating with any or a combination of a moisture-proofing material and a dielectric material, wherein further the moisture-proofing material and the dielectric material comprise parylene C.

9. The temperature sensor as claimed in claim 1, wherein the temperature sensor exhibits Temperature Coefficient of Resistance (TCR) ranging from 17.48×$10^{-3}$/K to −148.10×$10^{-3}$/K.

10. The temperature sensor as claimed in claim 1, wherein the temperature sensor exhibits Temperature Coefficient of Resistance (TCR) of −147.37×$10^{-3}$/K for a temperature below 10K.

11. The temperature sensor as claimed in claim 1, wherein the temperature sensor works at a temperature ranging from 400K to 2K.

12. The temperature sensor as claimed in claim 1, wherein the temperature sensor exhibits response time of around 80 msec at a cryogenic temperature.

13. The temperature sensor as claimed in claim 1, wherein the temperature sensor exhibits low current consumption and eliminates self-heating at low temperatures.

14. A cryogenic temperature sensor comprising:
a substrate; and a composite film deposited onto said substrate, wherein the composite film is further connected with a plurality of leads, characterized in that the composite film comprises an in-situ formed reduced graphene oxide-nickel composite;

wherein the in situ formed reduced graphene oxide-nickel composite exhibits resistive switching ability at temperatures below 100K.

* * * * *